No. 12,617. REISSUED MAR. 19, 1907.

T. J. CHENEY.

CHURN.

APPLICATION FILED OCT. 24, 1906.

Witnesses:
Frank L. Blanchard
E. R. Manchester

Inventor:
Thomas J. Cheney
By Jno. G. Elliott
Attorney.

THE NORRIS PETERS CO., WASHINGTON, D. C.

UNITED STATES PATENT OFFICE.

THOMAS J. CHENEY, OF LODI, OHIO, ASSIGNOR TO FRANK D. MERRILL, OF SEATTLE, WASHINGTON.

CHURN.

No. 12,617. Specification of Reissued Letters Patent. Reissued Mar. 19, 1907.

Original No. 805,710, dated November 28, 1905. Application for reissue filed October 24, 1906. Serial No. 340,407.

*To all whom it may concern:*

Be it known that I, THOMAS J. CHENEY, a citizen of the United States, residing at Lodi, in the county of Medina and State of Ohio, have invented new and useful Improvements in Churns, of which the following is a specification.

My invention relates to improvements in churns, and particularly to that class known as "aerating-churns," in which the separation of the solids from the liquids is produced by their subjection to rapidly revolve the blades, wings, and other projections inducing aerated-currents of air downwardly through the agitator into the liquid; and the paramount object of the invention is to porduce the separation of solids from liquids by currents of air downwardly through an agitator from which blades, wings, and other projections are wholly absent, and thereby entirely avoid subjecting the solids to the force of mechanical blows, and which inevitably break the globules to the detriment of both their separation and removal from the liquid, and to the subsequent preservation of their purity and by a generally-improved device of this class which will be exceedingly simple in construction, cheap of manufacture, and efficient in use and which will be better adapted to its intended purposes than any other device of the same class with which I am acquainted.

With these ends in view the invention is embodied in the novel construction, arrangement, and combination of parts hereinafter described, illustrated in the accompanying drawings, and particularly pointed out in the appended claims.

Figure 1:
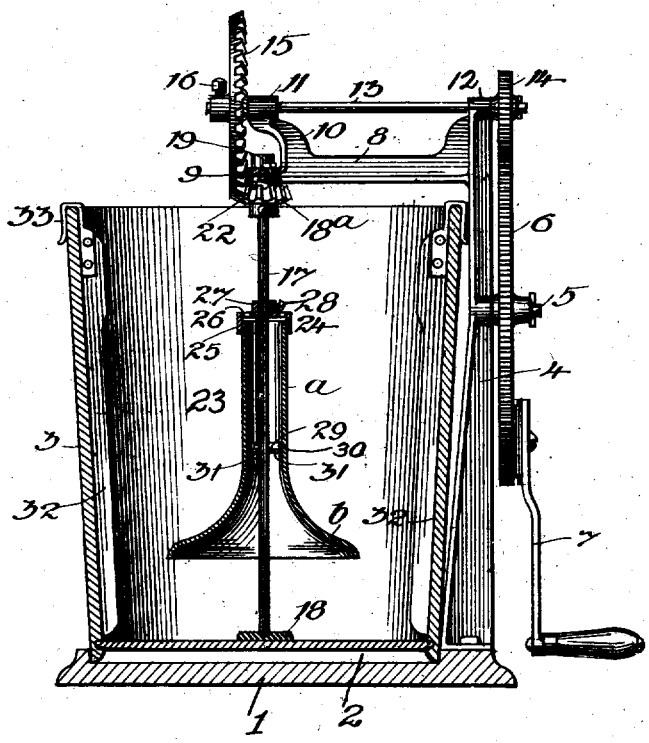
Figure 2:
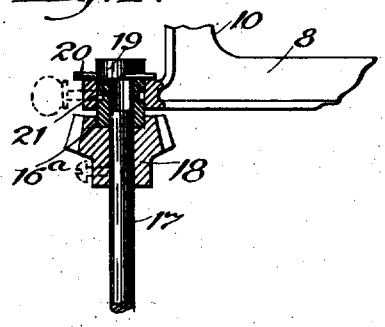
Figure 3:
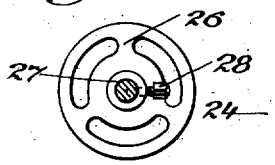

Referring to the accompanying drawings, forming a part of this specification, Figure 1 is a vertical sectional view of the churn-body and combined aerator and agitator and a plan view of the attached gearing constructed in accordance with my invention. Fig. 2 is a detail sectional view of the gearing formed at the upper end of the aerator and agitator-shaft. Fig. 3 is a detail top plan view of the cap for securing the upper end of the aerator and agitator to the central shaft for revolving the same.

Similar characters of reference indicate like parts throughout all the figures of the drawings.

1 designates the base-plate of the churn, adapted to be set upon a table or bench and may be secured thereto in any suitable and convenient manner. 2 designates an opening formed therein and adapted to receive and take over the bottom of the churn body or receptacle 3.

4 designates a vertically-arranged arm or standard suitably secured at its base to one side of the base-plate 1 and carrying a stub-shaft or pivot 5, upon which is mounted a driving gear-wheel 6, provided at its side with an adjustably-mounted operating-handle 7.

8 designates a horizontal supporting-arm formed in the present instance integral with the upper portion of the standard 4 and provided at or near its outer end with a bearing 9 and an upwardly-extending bracket 10, provided with a bearing 11. 12 designates a second bearing formed at the upper end of the standard 4, and said bearings 11 and 12 are adapted to receive and support a horizontal shaft 13, provided at one end with a pinion 14, meshing with the driving gear-wheel 6, and at the other with a bevel-gear 15, secured in the present instance by means of a set-screw 16.

17 designates a vertical shaft having a conical lower end adapted to rest in a socket-bearing 18, suitably secured at the center of the bottom or base of the churn body or receptacle 3. To the upper end of said vertical shaft 17 there is mounted a bevel-pinion 18, meshing with the bevel-gear 15 and provided with a central opening to form an annular recess $16^a$ about the upper end of the shaft 17.

19 designates a vertically-arranged cylindrical bearing or block mounted in the bearing 9 and having its lower end adapted to take into the annular recesses $16^a$ (see Fig. 2) and over the upper end of the vertical shaft 17 to form a bearing therefor.

20 designates a pin or key passing through the upper portion of the bearing or block 19 to support the same in proper vertical position and as an aid in lifting the same when it is desired to release the upper end of the shaft 17 when removing the same, as hereinafter described.

21 designates an annular recess formed about the bearing or block 19 and designed to receive the inner end of a thumb-nut 22, mounted in one side of the bearing 9, and by means of said thumb-nut 22 taking into said annular recess 21 the bearing or block 19 is held in proper position.

23 designates the combined aerator and agitator, mounted and secured to the shaft 17 by means hereinafter described and consisting, essentially, of a tubular stem *a*, surrounding the same, and an enlarged outwardly-extending end portion *b*.

When the combined aerator and agitator is rotated, the contents of the churn-body or receptacle lying within and about the enlarged outwardly-extending end portion *b* are rapidly thrown outward by centrifugal force, whereby the contents of the churn body or receptacle are thoroughly and rapidly agitated, and a downdraft or air through the tubular stem *a* is produced. The air rushes downwardly through the tubular stem to take the place of liquid thrown outward and with such force that the solids and liquid contents of the churn body or receptacle are thereby simultaneously agitated, separated, and aerated, whereby butter is rapidly produced.

In order to enable the combined aerator and agitator to be adjusted vertically to position it properly with relation to the contents of the churn body or receptacle, the tubular stem *a* is provided with a cap 24, consisting of a sleeve 25 and a spider 26, having a sleeve or tubular portion 27, which is clamped to the shaft 17 by a set-screw 28. The outer sleeve 25 is secured by screws or other suitable means to the top of the tubular stem *a*, and the inner sleeve or tubular portion is connected by the arms of the spider with the upper edge of the outer sleeve 25 and is located above the same. The set-screw 28 is adapted to engage the shaft 17 to secure the combined aerator and agitator at the desired elevation, and by these means the aerator and agitator is adapted to be properly arranged in the churn body or receptacle to suit the quantity of cream contained within the same, so that the upper end of the tubular stem will be the desired distance above the surface of the liquid and the enlarged outwardly-extending portion the desired depth in the liquid.

29 designates a ring or plate provided with a central opening adapted to receive the shaft 17 and an annular flange 30, suitably secured to the inner sides of the tubular stem *a* and provided with a series of openings 31, designed to admit of the passage of the air as it passes down through the tubular stem *a* when the same is revolved.

The circular motion of the liquid in the receptacle is retarded by a pair of depending strips 32, suspended within and adjacent to the inner sides of the receptacle by means of hooked straps 33, secured to the upper ends of the strips 32 and taking over the upper edges of the receptacle.

When it is desired to remove the combined aerator and agitator, the thumb-nut 22 is loosened so as not to engage the bearing or block 19, and said bearing or block is raised vertically far enough to clear the upper end of the vertical shaft 17 and bevel-pinion 18, whereby the upper end of the shaft may be moved laterally and then lifted out of the socket-bearing 18, secured to the bottom of the receptacle. In this way the inside of the receptacle may be cleared for removing butter and for washing and cleansing the receptacle and the combined aerator and agitator.

It is believed that by means of the construction, arrangement, and combination of parts shown and described the greatest possible aeration and agitation of the liquid are produced with the least possible friction.

This form of aerator and agitator as compared with former forms produces in the liquid less agitation through the agency of the agitator movement and greater agitation through the agency of the introduced air. It therefore can be operated with less power than previous devices of this class.

Having thus described my invention, what I claim, and desire to secure by Letters Patent, is—

1. In a churn the combination with a receptacle for the liquid, a combined agitator and aerator comprising a bell-shaped body portion, the walls of which present a smooth and unbroken surface to the liquid, said agitator being provided with air-inlets at a point above the surface of the liquid, and means for actuating said agitator about a fixed and unchangeable axis of rotation, whereby currents of air are induced through the agitator into the liquid, and the solids separated from the liquid without mechanical stirring up or agitating the entire mass thereof.

2. In a churn the combination with the receptacle for the liquid, a combined agitator and aerator comprising a bell-shaped body portion, the walls of which flare outwardly and present a smooth and unbroken surface to the liquid, said agitator being provided with air-inlets at a point above the surface of the liquid, and means for actuating said agitator about a fixed and unchangeable axis of rotation, whereby currents of air are induced through the agitator into the liquid, and the solids separated from the liquid without mechanical stirring up or agitating the entire mass thereof.

3. A combined agitator and aerator comprising a bell-shaped body, the walls of which present a smooth and unbroken surface to the liquid, and a tubular portion integral therewith, adapted to extend above the surface of the liquid, and provided with air-inlets toward its outer end, substantially as described.

4. A combined agitator and aerator comprising a bell-shaped body flaring outwardly at its lower end and having at its upper end a tubular projection provided with air-inlets at a point above the surface of the liquid, which said body portion presents a smooth and uniform surface to the liquid in which it is submerged, substantially as described.

THOMAS J. CHENEY.

Witnesses:
J. W. DUNLAP,
E. P. THOMAS.